United States Patent
Shapiro

(10) Patent No.: US 7,551,631 B1
(45) Date of Patent: Jun. 23, 2009

(54) SYSTEM FOR ROUTING INDEPENDENT PATHS IN AN INFINIBAND NETWORK

(75) Inventor: Jeremy N. Shapiro, Brighton, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 630 days.

(21) Appl. No.: 11/123,382

(22) Filed: May 6, 2005

(51) Int. Cl.
*H04L 12/28* (2006.01)
(52) U.S. Cl. .................. 370/401; 370/386; 709/238
(58) Field of Classification Search .......... None
See application file for complete search history.

(56) References Cited

U.S. PATENT DOCUMENTS

| | | | |
|---|---|---|---|
| 7,133,929 B1* | 11/2006 | Shah | 709/241 |
| 2003/0208572 A1* | 11/2003 | Shah et al. | 709/223 |
| 2004/0001487 A1* | 1/2004 | Tucker et al. | 370/389 |
| 2005/0071709 A1* | 3/2005 | Rosenstock et al. | 714/5 |

* cited by examiner

*Primary Examiner*—Duc C Ho
(74) *Attorney, Agent, or Firm*—Brooks Kushman P.C.

(57) ABSTRACT

The present invention provides systems and method methods for routing packet along redundant, independent paths. The routing is performed based on the destination node for the packets. In certain embodiments the method performs a different routing scheme based on the parity of a globally unique identifier (GUID) of the destination node.

21 Claims, 4 Drawing Sheets

SYSTEM FOR ROUTING INDEPENDENT PATHS IN AN INFINIBAND NETWORK

TECHNICAL FIELD

The present invention generally relates to networked systems, and particularly the routing of packets in a networked system, more particularly in an Infiniband network.

BACKGROUND INFORMATION

Infiniband (IB) is a high speed interconnect with fabrics consisting of switches and end nodes. Most end nodes in an Infiniband system have two ports. Packets are passed from switch to switch to reach the ports of a destination node. Each of these ports can be connected to a different switch to ensure independent redundant paths.

Within the Infiniband architecture each node is assigned a globally unique identifier (GUID). These GUIDs operate similar to Ethernet MACs and allow for accurate, efficient packet routing between nodes.

To ensure independent paths for the packets the switch connected to each port must route through a different switch for each destination port of the destination node. One solution is to forward all packets destined for the same port on the destination node through the same switch. The problem with this solution is if there is nothing connected to one of the ports of the destination node, then is it possible that only one switch will ever be forwarded though which makes for poor utilization of the network as well as a single point of failure for the system, i.e. the one switch all packets are routed though.

Thus what is needed is a method of routing packets over redundant, independent paths that do not suffer from the possibility of utilizing only one switch for the forwarding of packets.

SUMMARY OF THE INVENTION

The present invention provides systems and method methods for routing packet along redundant, independent paths. The routing is performed based on the destination node for the packets.

In accordance with a first aspect, a network system is provided having redundant independent routing paths. The system comprises first and second initial switches for routing packets, a destination node having a globally unique identifier and first and second ports for receiving packets, and third and fourth intermediate switches connected to the first and second switches and providing routing paths to the destination node, wherein packets are routed from the first and second switches to the third and fourth switches based on the globally unique identifier of the destination node.

In accordance with another aspect, a method is provided for routing packets in a network system. The method comprises providing a first and second switch for routing packets; providing a destination node for receiving packets, the destination node having a globally unique identifier and a first and second port; providing a third and fourth switch connected to the first and second switches and providing a routing pathway to the destination node; and routing packets from the first and second switches to the third and fourth switches based on the globally unique identifier of the destination node.

In accordance with another aspect, in a system comprising first and second initial switches for routing packets, a destination node having a globally unique identifier and first and second ports for receiving packets, third and fourth intermediate switches connected to the first and second switches and providing a routing path to the destination node; a method for routing packets is provided. The method comprises determining the parity of the globally unique identifier of the destination port; if the parity is zero, performing a first routing scheme; and if the parity is one, performing a second routing scheme.

In accordance with another aspect, a method is provided for routing packets in a network system. The method comprises providing a first and second switch for routing packets; providing a destination node for receiving packets, the destination node having a globally unique identifier and a first and second port; providing a third and fourth switch connected to the first and second switches and providing a routing pathway to the destination node; and determining the parity of the globally unique identifier of the destination port; if the parity is zero, performing a first routing scheme; and if the parity is one, performing a second routing scheme.

The details of various embodiments of the invention are set forth in the accompanying drawings and the description below. Other features and advantages of the invention will become apparent from the description, the drawings and the claims.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

The present invention provides systems and method methods for routing packet along redundant, independent paths. The routing is performed based on the destination node for the packets. In certain embodiments the method performs a different routing scheme based on the parity of a globally unique identifier (GUID) of the destination node.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Figure 1:
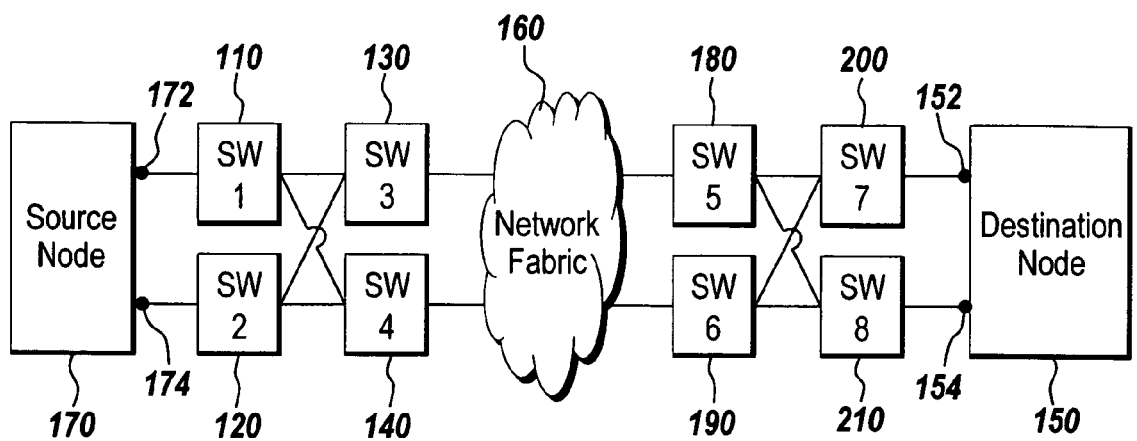
FIG. 1 is one embodiment of a system suitable for practicing the present invention.

FIG. 1 depicts one embodiment of a system 100 of the present invention. The system comprises first 110 and second 120 initial switches for routing packets, a destination port 150, and third 130 and fourth 140 intermediate switches connected to the first 110 and second 120 switches and providing a pathway via the general fabric of the network subnet 160 to the destination port 150. In certain embodiments there may be a source node 170 wherein the first 110 and second switches 120 are connected to the source node 170. In some embodiments there may also be other switches, such as fifth 180, sixth 190, seventh 200, and eighth 210 switches, in the routing pathway to the source node 150.

The switches 110, 120, 130, 140, 180, 190, 200, and 210 are network switches capable of routing packets in network system. Preferably, the switches 110, 120, 130, 140, 180, 190, 200, and 210 are capable of functioning in an Infiniband system. Suitable switches will be apparent to one skilled in the art given the benefit of this disclosure.

The nodes 150 and 170 are network devices capable of sending and receiving data packets in a networked system. Preferably, the nodes 150 and 170 are configured to operate in an Infiniband system. The destination node 150 has a globally unique identifier (GUID). The globally unique identifier (GUID) is a 64 bit identifier assigned to each node in a network. The destination node also has first 152 and second 154 ports for receiving packets. In this embodiment the first 152 and second 154 ports are connected to the fabric of the subnet through the seventh 200 and eighth 210 switches respectively. In embodiments wherein there is a source node 170, the source node also has first 172 and second 174 ports. In this example the first 172 and second 174 ports are connected to the first 110 and second 120 switches respectively. Suitable network devices will be apparent to one skilled in the art given the benefit of this disclosure.

Figure 2:
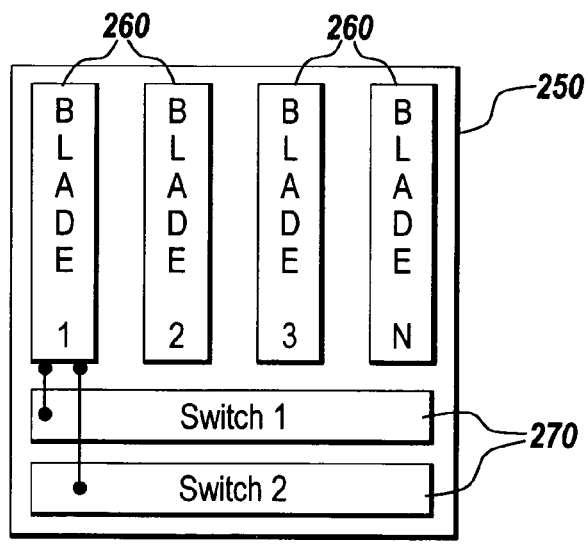
FIG. 2 is another embodiment of the system of the present invention.

FIG. 2 depicts one possible embodiment where the nodes 150 and 170 are blades 260 in a server blade chassis 250 and the switches 110, 120, 130, 140, 180, 190, 200, and 210 may be switches 270 in a server blade chassis 250. Other possible configurations and implementations will be apparent to one skilled in the art given the benefit of this disclosure.

Figure 3:
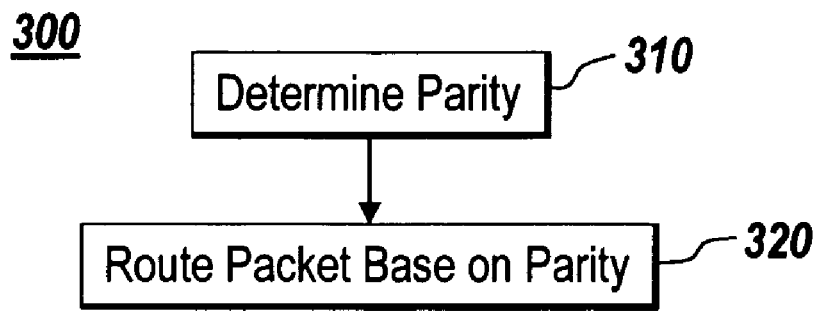
FIG. 3 is a flow chart depicting one embodiment of a method of the present invention.

In such a system as depicted in FIG. 1, packets are routed from the first 110 and second 120 switches to the third 130 and fourth 140 switches based on the globally unique identifier (GUID) of the destination node 150. In certain embodiments, the routing of packets is based on the parity of the GUID. An exemplary flow chart 300 depicting one embodiment of this process can be seen in FIG. 3. In this example, the parity of the GUID of the destination node 150 is determined, step 310. One method of determining parity is to XOR the last eight bits of the GUID. After the parity is determined, the packets are routed based on the parity of the GUID of the destination node 150, step 320. For example if the parity is 0, then a first routing scheme may be implemented and if the parity is 1, implementing a second routing scheme.

Figure 4:
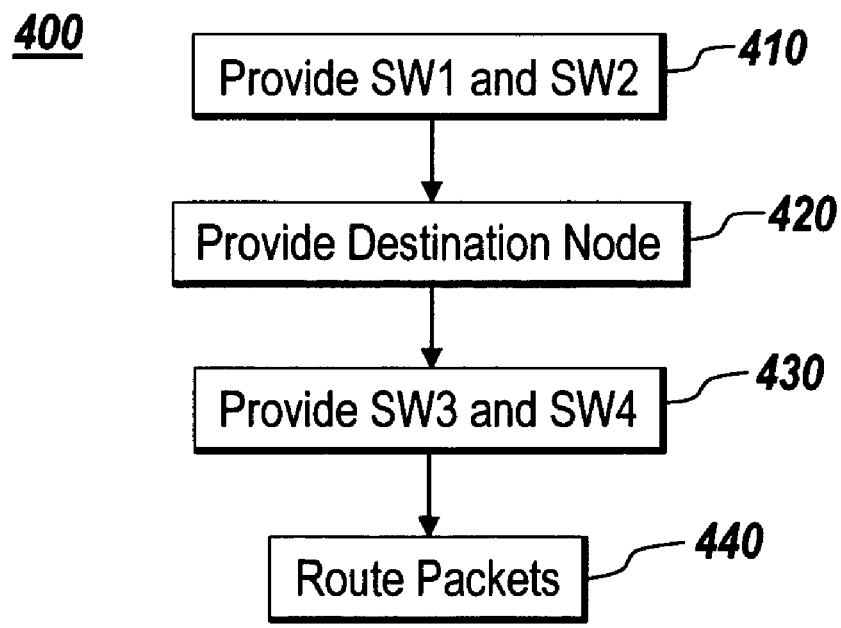
FIG. 4 is a flow chart depicting another embodiment of a method of the present invention.

Another embodiment of a methodology for implementing the present invention can be seen in the flow chart 400 of FIG. 4. The first step is providing first 110 (SW1) and second 120 (SW2) switches for routing packets, step 410. The next step is providing a destination node 150 for receiving packets, step 420. The third step is providing third 130 (SW3) and fourth 140 (SW4) switches connected to the first 110 (SW1) and second 120 (SW2) switches providing routing paths to the destination node 150, step 430. The final step is routing packets from the first 110 (SW1) and second 120 (SW2) switches to the third 130 (SW3) and fourth 140 (SW4) switches based on the GUID of the destination node 150, step 440. The method may also include additional steps providing a source node 170 and additional switches 180, 190, 200, and 210 such as depicted in FIG. 1.

Figure 5:
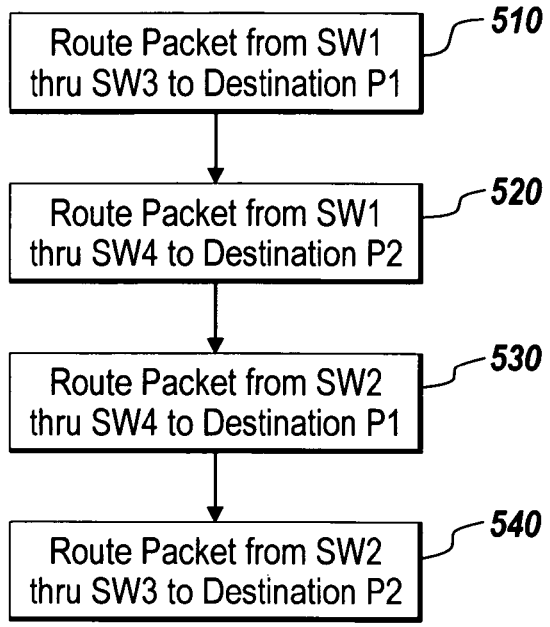
FIG. 5 is a flow chart depicting one embodiment of a first possible scheme for routing packets in the system of the present invention.

FIG. 5 depicts a flow chart 500 of one embodiment of a first scheme that may be used for routing packets from the first 110 (SW1) and second 120 (SW2) switches to the third 130 (SW3) and fourth 140 (SW4) switches. The first step involves routing packets from the first switch 110 (SW1) to the third switch 130 (SW3) to route to the first port 152 (P1) of the destination node 150, step 510. The next step is routing packets from the first switch 110 (SW1) to the fourth switch 140 (SW4) to route to the second port 154 (P2) of the destination node 150, step 520. Next is routing packets from the second switch 120 (SW2) to the fourth switch 140 (SW4) to route to the first port 152 (P1) of the destination node 150, step 530. The final step is routing packets from the second switch 120 (SW2) to the third switch 130 (SW3) to route to the second port 154 (P2) of the destination node 150, step 540. It should be understood that the presented order of steps is merely for example and the steps may be performed in any order without affecting the functionality of the scheme.

In certain embodiments this scheme may be performed based on the parity of the GUID of the destination port. For example, this scheme may be performed if the parity of the GUID of the destination port is zero. Other implementations will be apparent to one skilled in the art given the benefit of this disclosure.

Figure 6:
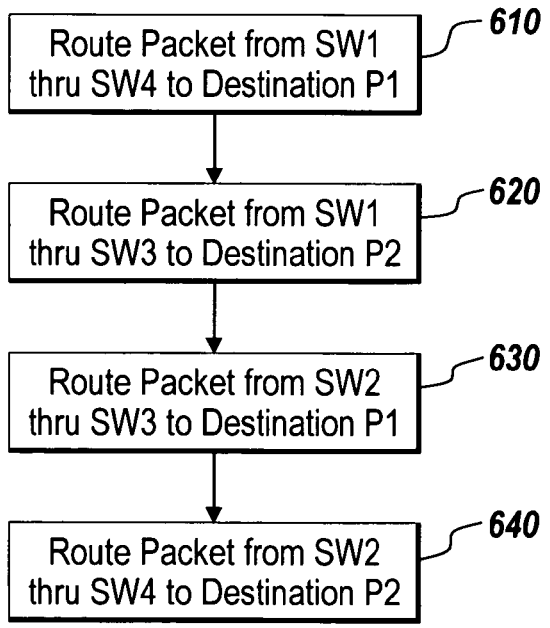
FIG. 6 is a flow chart depicting one embodiment of a second possible scheme for routing packets in the system of the present invention.

FIG. 6 depicts a flow chart 600 of one embodiment of a second scheme that may be used for routing packets from the first 110 (SW1) and second 120 (SW2) switches to the third 130 (SW3) and fourth 140 (SW4) switches. The first step involves routing packets from the first switch 110 (SW1) to the fourth switch 140 (SW4) to route to the first port 152 (P1) of the destination node 150, step 610. The next step is routing packets from the first switch 110 (SW1) to the third switch 130 (SW3) to route to the second port 154 (P2) of the destination node 150, step 620. The third step is routing packets from the second switch 120 (SW2) to the third switch 130 (SW3) to route to the first port 152 (P1) of the destination node 150, step 630. The fourth step is routing packets from the second switch 120 (SW2) to the fourth switch 140 (SW4) to route to the second port 154 (P2) of the destination node 150, step 640. It should be understood that the presented order of steps is merely for example and the steps may be performed in any order without affecting the functionality of the scheme.

In certain embodiments this scheme may be performed based on the parity of the GUID of the destination port. For example, this scheme may be performed if the parity of the GUID of the destination port is one. Other implementations will be apparent to one skilled in the art given the benefit of this disclosure.

For the purposes of routing it may be beneficial to have a methodology for determining if a switch in a system will function as the first switch 110 (SW1) or second switch 120 (SW2). One way of solving this is labeling the switches as peers when they have the end node GUID in common. The switch peer with the lower node GUID is the first switch 110 (SW1) and the peer with the higher node GUID is the second switch 120 (SW2). As each end node port is discovered, if a switch connected to the port does not have a peer, the other port of the end node is examined. If there is a switch connected to the other port, the switch connected to the first port and the switch connected to the second port are peers. It should be noted if the switches have multiple peers than this will not guarantee independent path routing.

Figure 7:
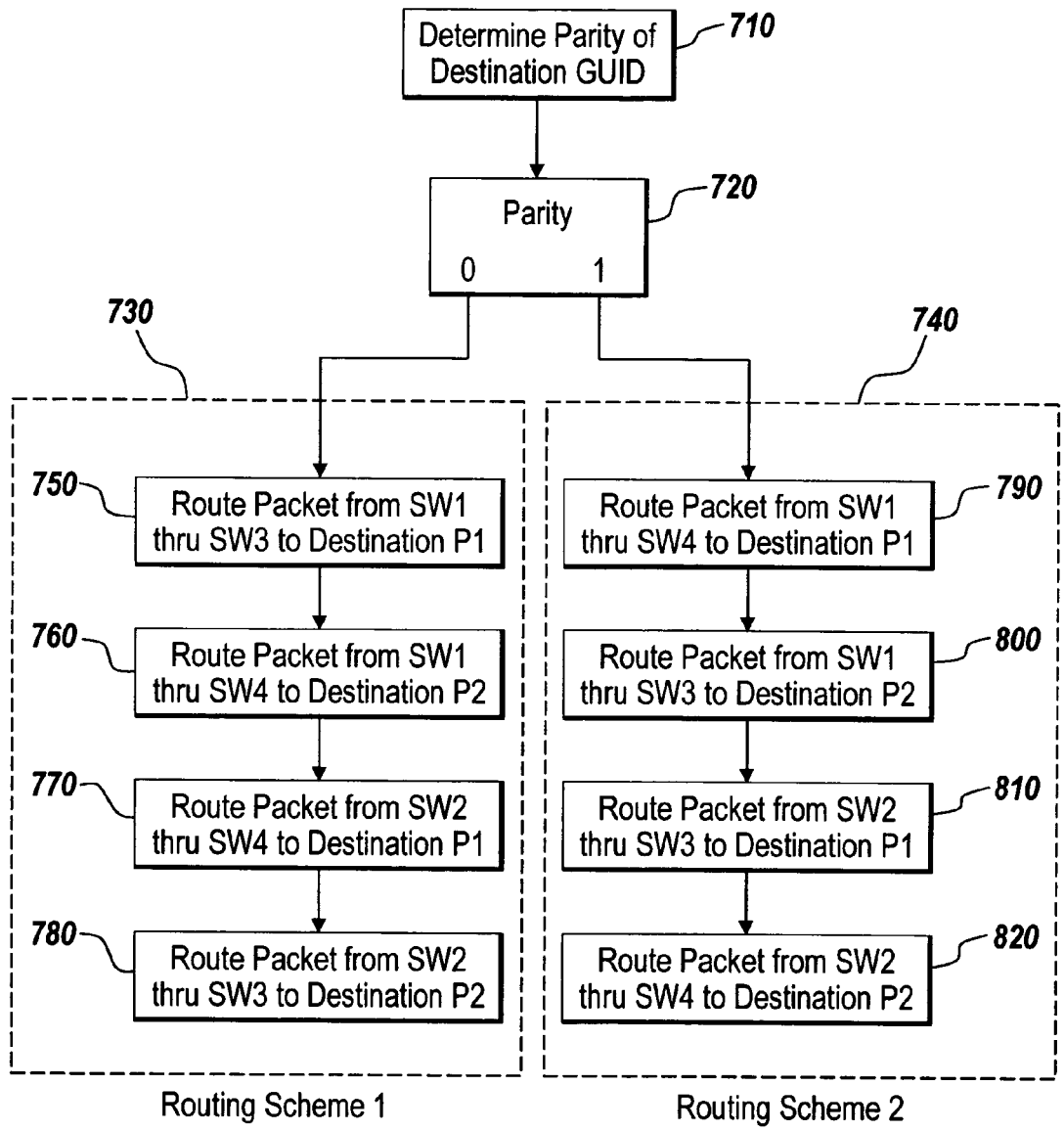
FIG. 7 is a flow chart one embodiment of a method for routing packets using a first or second possible scheme based on the parity of GUID of the destination node.

FIG. 7 depicts a flow chart 700 of another embodiment of one methodology of the present invention wherein one of two routing schemes is performed based on the parity of the GUID of the destination node 150. The first step, is determining the parity of the GUID of the destination node 150, step 710. As discussed above this may be performed by XORing the last eight bits of the GUID. Based on the parity, one of two schemes are performed, step 720. In this example, if the parity is 0, then a first routing scheme 730 is performed. If the parity is 1, then a second routing scheme 740 is performed.

The first routing scheme is similar to the scheme depicted in FIG. 5. The first step involves routing packets from the first switch 110 (SW1) to the third switch 130 (SW3) to route to the first port 152 (P1) of the destination node 150, step 750. The next step is routing packets from the first switch 110 (SW1) to the fourth switch 140 (SW4) to route to the second port 154 (P2) of the destination node 150, step 760. Next is routing packets from the second switch 120 (SW2) to the fourth switch 140 (SW4) to route to the first port 152 (P1) of the destination node 150, step 770. The final step is routing packets from the second switch 120 (SW2) to the third switch 130 (SW3) to route to the second port 154 (P2) of the destination node 150, step 780. It should be understood that the presented order of steps is merely for example and the steps may be performed in any order without affecting the functionality of the scheme.

The second routing scheme is similar to the scheme depicted in FIG. 6. The first step involves routing packets from the first switch 110 (SW1) to the fourth switch 140 (SW4) to route to the first port 152 (P1) of the destination node 150, step 790. The next step is routing packets from the first switch 110 (SW1) to the third switch 130 (SW3) to route to the second port 154 (P2) of the destination node 150, step 800. The third step is routing packets from the second switch 120 (SW2) to the third switch 130 (SW3) to route to the first port 152 (P1) of the destination node 150, step 810. The fourth step is routing packets from the second switch 120 (SW2) to the fourth switch 140 (SW4) to route to the second port 154 (P2) of the destination node 150, step 820. It should be understood that the presented order of steps is merely for example and the steps may be performed in any order without affecting the functionality of the scheme.

Although the illustrative embodiments of the claimed methodology is described in a Infiniband system, the present invention is applicable to any other system having ports, each with a unique global identifier. Other embodiments will be apparent to one skilled in the art given the benefit of this disclosure.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A network system having redundant independent routing paths, the system comprising:
   first and second initial switches for routing packets;
   a destination node having a globally unique identifier and first and second ports for receiving packets; and
   third and fourth intermediate switches connected to the first and second switches and providing routing paths to the destination node;
   wherein packets are routed from the first and second switches to the third and fourth switches based on a parity check of the globally unique identifier of the destination node.

2. The system of claim 1 wherein the parity check of the globally unique identifier of the destination node is obtained by performing a XOR function on the last eight bits of the globally unique identifier of the destination node.

3. The system of claim 1 wherein the network system is an Infiniband system.

4. The system of claim 1 wherein the step of routing packets from the first and second switches to the third and fourth switches comprises:
   routing packets from the first switch to the third switch to route to the first port of the destination node;
   routing packets from the first switch to the fourth switch to route to the second port of the destination node;
   routing packets from the second switch to the fourth switch to route to the first port of the destination node; and
   routing packets from the second switch to the third switch to route to the second port of the destination node.

5. The system of claim 4 wherein the routing is based on the parity of the globally unique identifier of the destination node.

6. The system of claim 5 wherein the routing is performed if the parity of the globally unique identifier is zero.

7. The system of claim 1 wherein the routing packets from the first and second switches to the third and fourth switches comprises:
   routing packets from the first switch to the fourth switch to route to the first port of the destination node;
   routing packets from the first switch to the third switch to route to the second port of the destination node;
   routing packets from the second switch to the third switch to route to the first port of the destination node; and
   routing packets from the second switch to the fourth switch to route to the second port of the destination node.

8. The system of claim 7 where the routing is based on the parity of the globally unique identifier of the destination node.

9. The system of claim 8 wherein the routing is performed if the parity of the globally unique identifier is one.

10. The system of claim 1 further comprising a source node having a first and second port for sending packets, wherein the first switch is connected to the first port of the source node and the second switch is connected to the second port of the source node.

11. A method for routing packets in a network system, the method comprising;
   providing a first and second switch for routing packets;
   providing a destination node for receiving packets, the destination node having a globally unique identifier and a first and second port;
   providing a third and fourth switch connected to the first and second switches and providing a routing pathway to the destination node; and
   routing packets from the first and second switches to the third and fourth switches based on a parity check of the globally unique identifier of the destination node.

12. The method of claim 11 wherein the parity check of the globally unique identifier is obtained by performing a XOR function on the last eight bits of the globally unique identifier.

13. The method of claim 11 wherein the step of routing packets from the first and second switches to the third and fourth switches comprises:
   routing packets from the first switch to the third switch to route to the first port of the destination node;
   routing packets from the first switch to the fourth switch to route to the second port of the destination node;

routing packets from the second switch to the fourth switch to route to the first port of the destination node; and routing packets from the second switch to the third switch to route to the second port of the destination node.

14. The method of claim 13 wherein the routing is based on the parity of the globally unique identifier of the destination node.

15. The method of claim 14 wherein the routing is performed if the parity of the globally unique identifier is zero.

16. The method of claim 11 wherein the step of routing packets from the first and second switches to the third and fourth switches comprises:

routing packets from the first switch to the fourth switch to route to the first port of the destination node;

routing packets from the first switch to the third switch to route to the second port of the destination node;

routing packets from the second switch to the third switch to route to the first port of the destination node; and routing packets from the second switch to the fourth switch to route to the second port of the destination node.

17. The method of claim 16 wherein the routing is based on the parity of the globally unique identifier of the destination node.

18. The method of claim 17 wherein the routing is performed if the parity of the globally unique identifier is one.

19. In a system comprising first and second initial switches for routing packets, a destination node having a globally unique identifier and first and second ports for receiving packets, third and fourth intermediate switches connected to the first and second switches and providing a routing path to the destination node; a method comprising:

determining the parity of the globally unique identifier of the destination port;

if the parity is zero, performing a first routing scheme; and if the parity is one, performing a second routing scheme.

20. The method of claim 19 wherein the first routing scheme comprises:

routing packets from the first switch to the third switch to route to the first port of the destination node;

routing packets from the first switch to the fourth switch to route to the second port of the destination node;

routing packets from the second switch to the fourth switch to route to the first port of the destination node; and routing packets from the second switch to the third switch to route to the second port of the destination node.

21. The method of claim 19 wherein the second routing scheme comprises:

routing packets from the first switch to the fourth switch to route to the first port of the destination node;

routing packets from the first switch to the third switch to route to the second port of the destination node;

routing packets from the second switch to the third switch to route to the first port of the destination node; and routing packets from the second switch to the fourth switch to route to the second port of the destination node.

* * * * *